Jan. 7, 1958      H. B. NIELSEN      2,818,609
METAL SWING WINDOW STOP
Filed Oct. 11, 1955      5 Sheets-Sheet 1
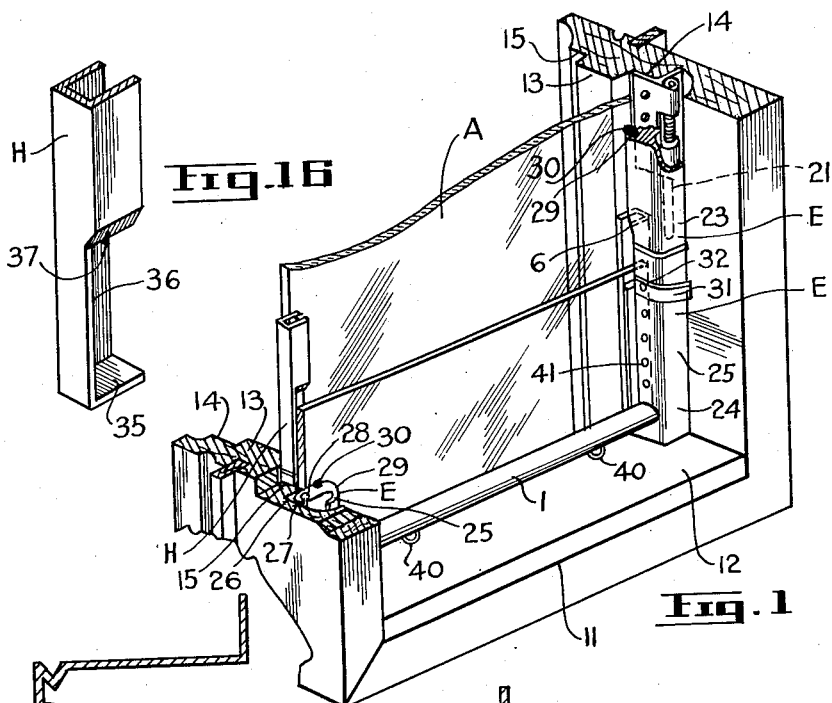
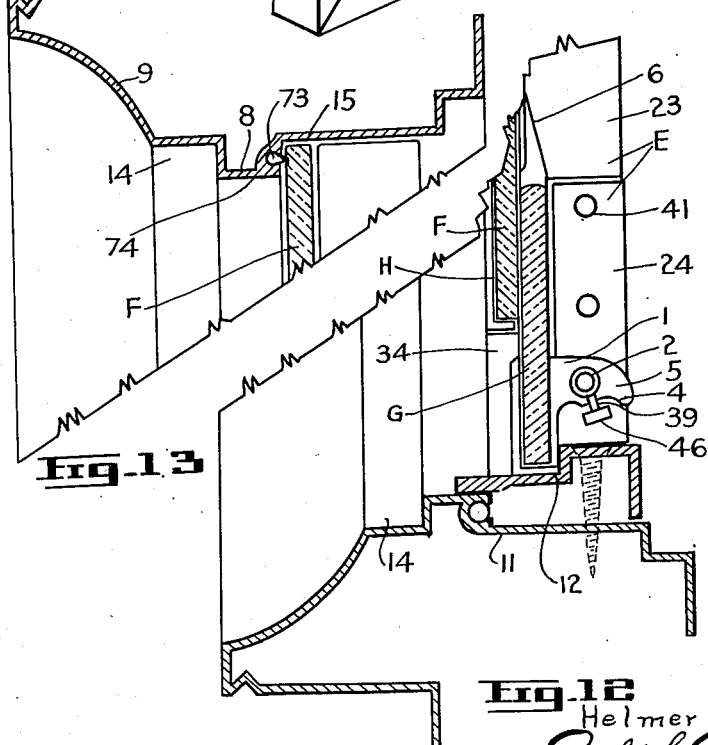
INVENTOR
Helmer B. Nielsen
Ralph Burch
Attorney Jan. 7, 1958  H. B. NIELSEN  2,818,609
METAL SWING WINDOW STOP
Filed Oct. 11, 1955  5 Sheets-Sheet 2
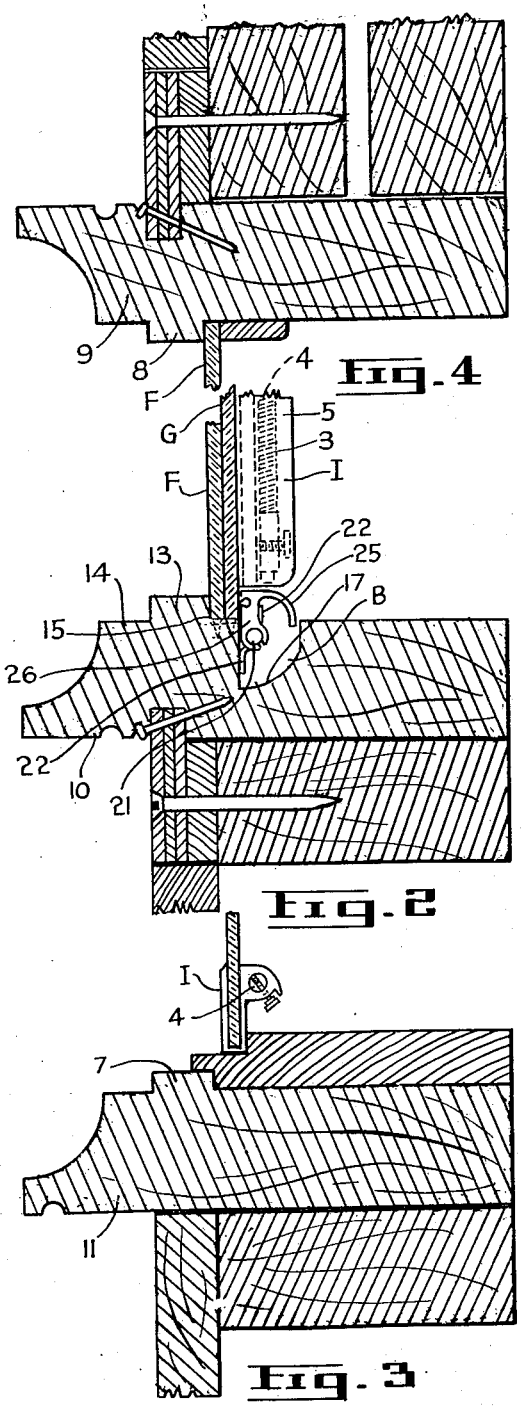
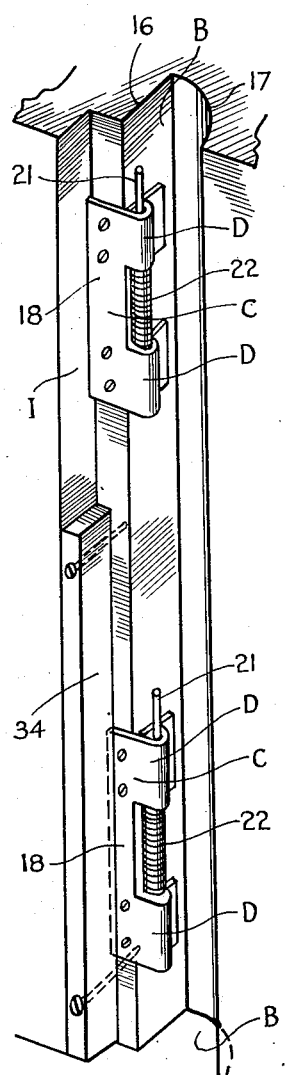
INVENTOR
Helmer B. Nielsen
Ralph Burch
Attorney INVENTOR
Helmer B. Nielsen
Ralph Burch
Attorney Jan. 7, 1958   H. B. NIELSEN   2,818,609
METAL SWING WINDOW STOP
Filed Oct. 11, 1955   5 Sheets-Sheet 4
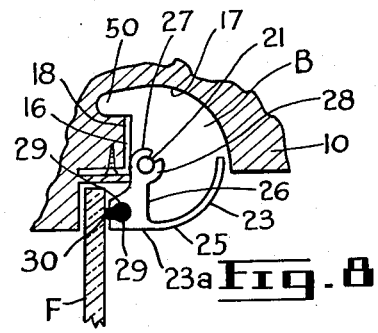
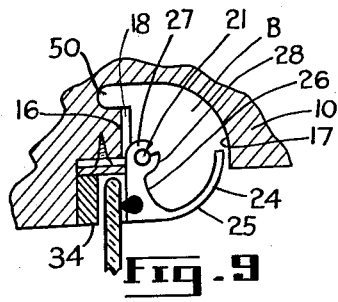
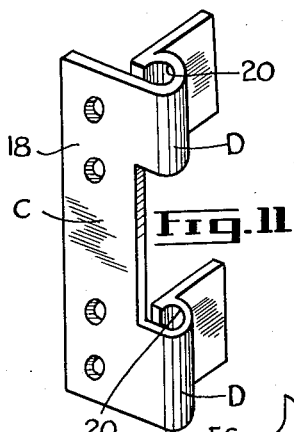
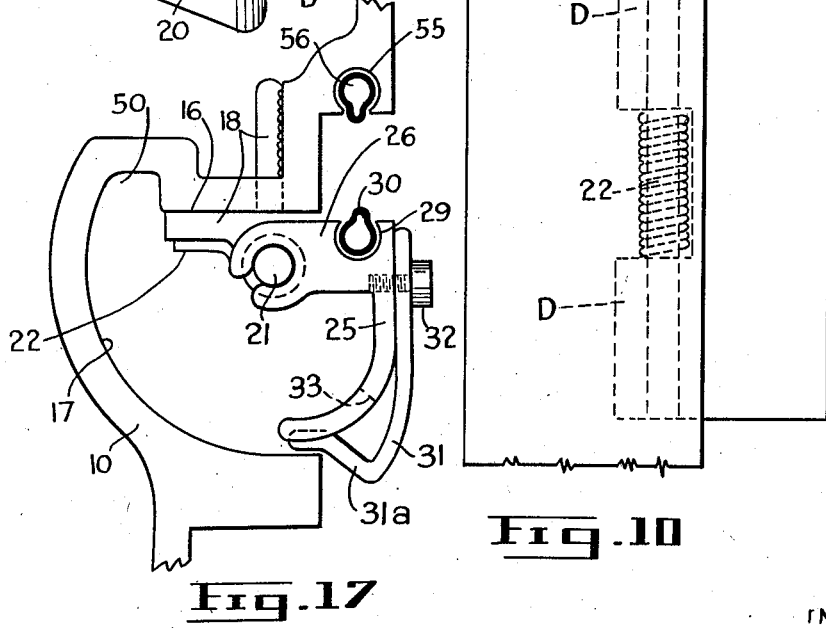
INVENTOR
Helmer B. Nielsen
Ralph Burch
Attorney Jan. 7, 1958  H. B. NIELSEN  2,818,609
METAL SWING WINDOW STOP Filed Oct. 11, 1955  5 Sheets-Sheet 5

INVENTOR
Helmer B. Nielsen
Ralph Burch
Attorney

United States Patent Office

2,818,609
Patented Jan. 7, 1958

2,818,609

METAL SWING WINDOW STOP

Helmer Birkebeck Nielsen, Haney, British Columbia, Canada

Application October 11, 1955, Serial No. 539,798

14 Claims. (Cl. 20—52)

My invention relates to window frames and windows.

The cleaning of windows, particularly in tall buildings is hazardous besides being expensive if the cleaners have to clean the windows from the outside of the building. This involves not only the possibilities of accidents but also entails the use of costly equipment.

It is one of the objects of my invention to provide a window frame which may be used with sash or sashless windows in such a way that the windows may be readily removed from inside a building so permitting the windows being cleaned within the building without undue risk of accident.

A benefit derived from the use of sashless windows is that additional effective area of the glass for lighting purposes is made available and these sashless windows are of great utility when installed on the shady side of a building as rooms located on such sides require as much light as is available.

Another object is to provide hinged stops on the window frame capable of being opened to give ready access for the installing or removal of windows in the frame, and also providing a weather-tight sealing of the windows.

A further object is to eliminate rattling of the windows.

Still a further object is to provide for the use of permanent storm windows if such should be found necessary and desirable, and generally to adapt the window frame to better perform the functions required of it. Other objects will be made clear as the specification develops.

So that the nature of my invention will be clearly understood I have illustrated and described it in detail, but I wish it to be understood that structural changes may be made within the scope of my appended claims without departing from the spirit of my invention.

In the drawings:

Figure 1 is a perspective view of a wooden window frame and windows embodying my invention, the upper portion of the frame and window being broken away;

Figure 2 is a transverse section through a jamb of the window frame and showing my improved window stop, also the lift bar for the lower portion of the windows;

Figure 3 is a vertical section through the window sill and stool and showing the lift bar for the lower portion of the window;

Figure 4 is a vertical section through the window frame header and showing part of the upper glass window in engagement with the header;

Figure 5 is a perspective view of the vertical arcuate recess in the window jamb, and showing the location of the upper and lower hinge plates;

Figure 8 is a transverse section through the upper portion of one type of window jamb showing the arcuate window stop hinged to the hinge plate;

Figure 9 is a transverse section through the lower portion of one type of window jamb showing the lower arcuate window stop hinged to the hinge plate;

Figure 10 is a fragmentary portion of a window stop in front elevation showing it pivotally mounted on a hinge plate, and the resilient locking plate on the outer face of the stop;

Figure 11 is a perspective view of the hinge plate designed to be mounted on the window jamb;

Figure 12 is a vertical section through the window sill and stool showing the windows and the upper and lower window stops, and the lifting bar for the lower window, the frame being fabricated from sheet metal;

Figure 13 is a vertical section through a window frame header of sheet metal showing part of the upper window;

Figure 16 is a fragmentary view of part of a window divider;

Figure 17 is a transverse section through a window stop pivotally mounted on a hinge plate and showing the resilient locking plate on the outer face of the stop;

Like characters of reference refer to like parts in the several figures.

Figure 15:
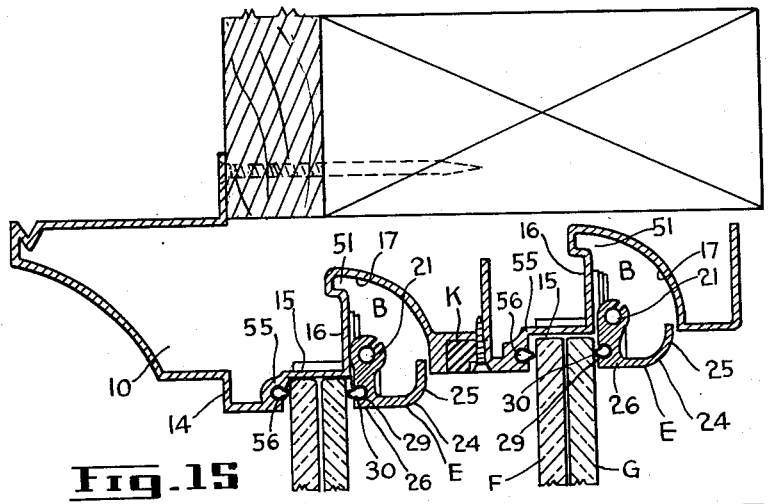
Figure 15 is a transverse section through a metallic window jamb adapted for use as a double window.

Referring to the drawings the same structural elements appear in the several figures of the drawings but the window frames may be constructed of wood or pressed metal.

A, represents a window frame consisting of a header 9, side jambs 10, a window sill 11, and a window stool 12. The jambs are formed on their inner faces with a central vertically disposed parting strip 13 providing angular recesses 14, and 15 on the walls of the jambs.

The header 9 has a parting strip 8, and the window sill 11, is provided with a rectangular projecting strip 7, and as the parting strip 8, and the projecting strip 7 register with the parting strips 13 on the jambs 10 then the recesses 14, and 15 extend all around the inner walls of the frame A.

Each jamb is provided in its inner wall, and in front of the recess 15 with a vertically disposed recess B, one wall 16 of which is at right angles to the face of the jamb. The other or forward wall 17 of the recess B is arcuate so that the recesses simulate more or less a longitudinal sector of a hollow cylinder. The recess B extends from the under face of the header 9 of the window frame to the upper face of the window stool 12.

Each recess B is provided with a vertically disposed rectangular recess 1, which is located adjacent to the wall 16. Hinges C each formed of an angle plate 18 are secured by suitable means to the inner face of the recess 1, as shown in Figure 5. From the corner of the angle plate 18, and in alignment with one of the side members thereof a projection D extends provided with a central orifice 20 through which the hinge pin 21 passes. The projection D is cut away intermediate of its length to accommodate a coil spring 22 which encircles the hinge pin 21, The opposite jambs of the window frame A are similar so that only one is described.

The cover E of the recess B forms a stop plate for the windows, and is formed of upper and lower parts 23 and 24, the upper part being wider than the lower part. Each of the parts 23 and 24 is formed with an arcuate wall 25 which is provided at one of its lateral edges with a radially inwardly extending wall 26 which terminates in hinged portion 27 having an orifice 28 therethrough with which the hinge pin 21 engages. By reference to Figure 9 it will be seen that the outer face of the radial wall 26 of the lower portion 25 of the window stop E is provided with a vertically extending groove 29 which holds a rubber insert 30.

By reference to Figure 8 it will be seen that the upper part 23 of the stop plate E is formed with a vertically disposed rib 23a projecting from the radial wall 26 and this rib is provided on its outer face with a groove 29, which holds a rubber insert 30. The thickness of the rib 23a is equal to the thickness of the bottom portion of the glass window with which my window frame is equipped.

As there are individual hinges C in the upper and lower parts of the recess B it will be clear that the upper part 23 and the lower part 24 of the cover plate E will be individually spring pressed into closed position over the recess B since the spring 22 mounted on the hinge pin 21 has one end engaging the hinge plate 18 while the other end engages the radially extending wall of the cover stop plate E, and as these springs are under tension they exert pressure on the upper and lower parts of the cover stop plate E to hold each of the said parts individually in closed position.

The upper part 23 of the cover stop plate E has the lower edge of its radial walls 26 bevelled as shown at 6.

Each of the parts 23 and 24 of the cover stop plate E is provided with a locking leaf spring 31 which is secured in position on the arcuate wall 25 by the set screw 32, and as the arcuate wall 25 is provided with a notch 33, the leaf spring 31 may be pressed inwardly until the offset portion 31a of the spring clears the lip of the arcuate wall 17 of the recess B so permitting the upper and/or lower parts of the cover stop plate E being rotated inwardly into the recess B. This offset portion 31a of the spring 31 has an open angled slope to permit it to slip over the above said lip when required.

It will be clear that the radial wall 26 and the recess 15 form a U-shaped guide channel to accommodate the upper window F and the lower window G. Behind the vertical edges of the lower window G vertically disposed rectangular stop bars 34 are located in the rectangular recess 1, and these bars engage with the lower edge of the upper window F and hold it in position.

The upper window F is provided on its vertical edges with glass dividers H which are shown in Figures 1, 2 and 16, and the body of these dividers is channel shaped in cross section, and the lower end of the channel is formed with a transverse wall 35 to engage the lower edge of the upper window F. One of the lateral walls of the channel is cut away as shown at 36, and the upper edge 37 of this cut away portion is bevelled. These glass dividers frictionally embrace the marginal vertical edges of the upper window F.

The lifting bar 1, of the lower window G, is channel shaped in cross section and is shown in Figures 2, 3 and 12, and it embraces the marginal portion of the window adjacent its lower edge, and from this lifting bar there extends a projecting hand grip 5 provided with a longitudinally extending cylindrical groove 4 which houses a compression spring 3. A locking pin 2 is slidably mounted in each end of the groove 4, and is normally spring pressed outwardly but may be manually retracted by the push button 39 which is attached at its inner end of the locking pin 2, and is formed with a finger piece 40 at its outer end. The locking pins 2 are adapted to engage with the orifices 41 provided in the arcuate wall 25 of the lower part 24 of the cover stop plate E.

The overlapping marginal portions of the upper and lower windows F and G in close contact when the windows are closed as will be seen by reference to Figure 1.

When it is desired to lift the lower window the operator grips the lifting bar 1, and presses the finger grips 40 towards each other so retracting the locking pins 2 against the action of the coil spring 3, and disengages the locking pins from the orifices 41 permitting the window G to be lifted.

When the window G is lifted to the desired extent the locking pins 2 will then engage with registering orifices 41 in the arcuate wall 25 of the lower parts 24 of the cover plates E so retaining the window G in the desired open position.

It will be noted that as the lower window G is being lifted the upper edge of the window engages the bevelled edges 37 of the glass divider H so permitting the lower window G to pass readily in front of the upper window F, and during this lifting movement of the window G its upper outer edges engage the lower bevelled edges 6 of the upper parts 23 of the cover plates E so pressing the upper parts outwardly and rotating them very slightly against the action of the springs 22.

This movement of the upper parts 23 of the stop plates E is just sufficient to permit of the lower window G being lifted while at the same time keeping the lower window G in as close proximity as possible with the upper window F.

When the lower window G is closed or lowered, it disengages the beveled edges 6 of the upper parts 23 of the cover stop plates E, and the windows assume the closed position shown in Figure 1.

To remove the windows F and G from the window frame A, it is only necessary to press the leaf springs 31 inwardly towards the recess B, and as the offset end 31a, of the spring rides over the lip of the arcuate wall 17 of the recess B then the upper, and lower parts of the cover stop plate E on one side of the window frame may be rotated into the adjacent recess B. A similar operation is then carried out on the other side of the window frame A to permit the upper and lower parts of the other cover stop plate E being rotated into its adjacent recess B.

When the upper and lower portions 23 and 24 of the cover stop plate E are rotated into the recesses B the outer face of the leaf springs 31 engage the inner periphery of the arcuate wall 17 of the recess B, and so frictionally resist the tendency of the springs 22 closing the two portions 23 and 24 of the cover plate E. This gives unimpeded access to the windows F, and G which may be bodily removed from the window frame A for cleaning purposes.

In replacing the windows F and G in the window frame A the windows are placed in the recess 15 with the upper window F resting on the top bars 34, the lower window G is then placed in the recess in front of the window F, and when so positioned the upper, and lower parts 23, and 24 of each cover stop plate E is rotated into open position to enclose the windows within the window frame.

Reference is now made to Figures 8 and 9 which show a side jamb 10 of wood in which the recess B is formed with a vertically extending U-shaped pocket 50 at the junction of the arcuate wall 17, and the radial wall 16. The lateral edge of the arcuate wall 25 of the cover stop plate E extends into this pocket when the stop plate is rotated into the recess B. In other respects these side jambs are similar to those already described.

Figure 14:
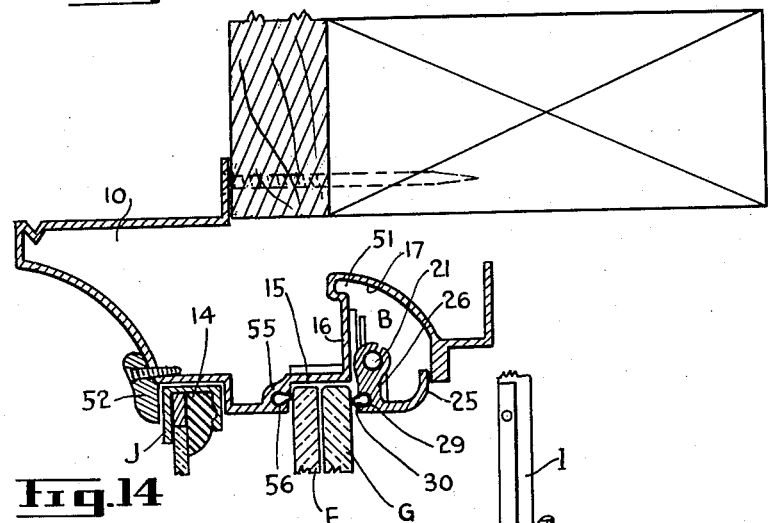
Figure 14 is a transverse section through a metallic window jamb showing the location of the window stop, and windows, and the provision for a storm window.
Figure 6:
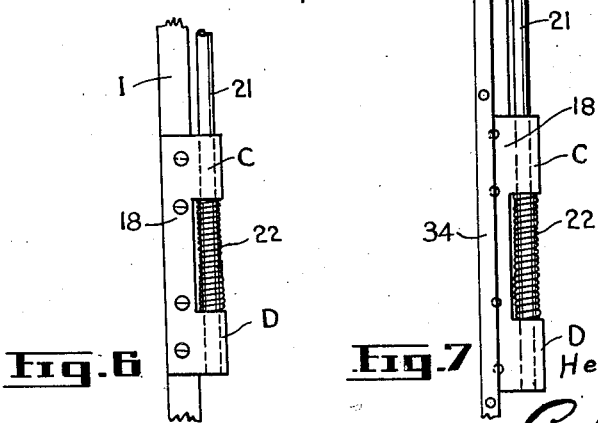
Figure 6 is a side elevation of part of the upper hinge secured to the window frame and showing the hinge pin and the torsion spring mounted on the pin.
Figure 7:
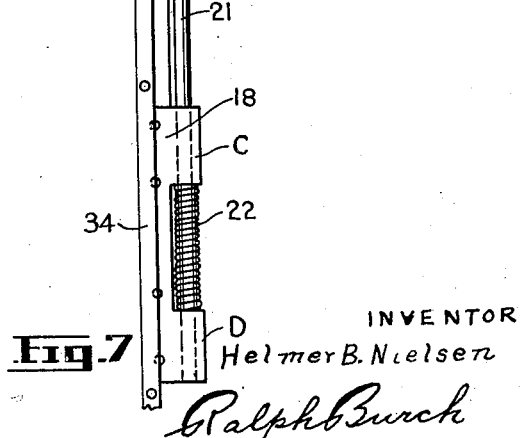
Figure 7 is a side elevation of part of the lower hinge secured to the window frame and showing the hinge pin and torsion spring also the stop bar.
Figure 19:
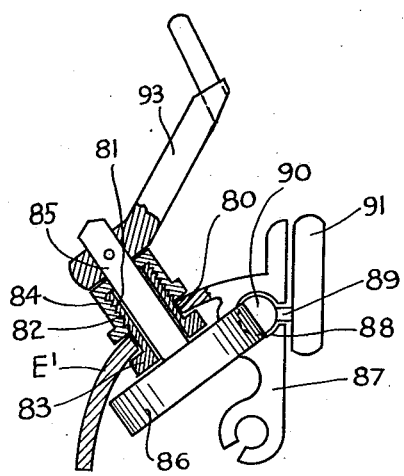
Figure 19 is a sectional elevation of a cover stop plate showing details of the crank operated mechanism for opening and closing one of the glass portions of the window.
Figure 18:
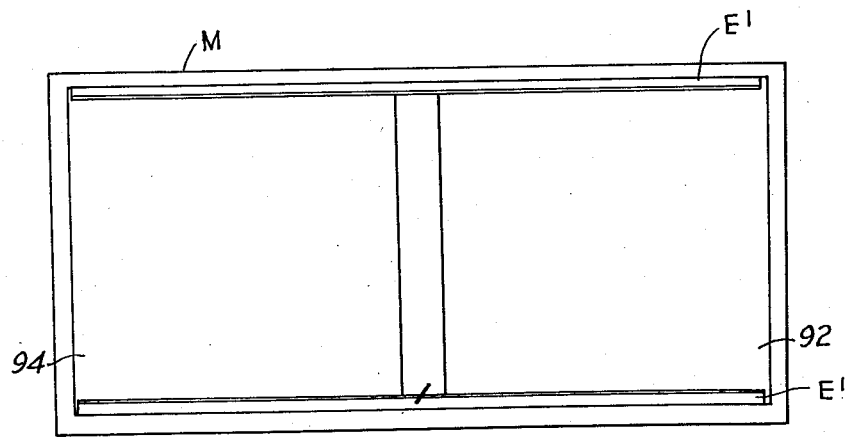
Figure 18 is a front elevation of a sashless window the glass of which is formed of two rectangular overlapping portions and showing the location of the crank arm for moving one of the glass portions into open or closed position.

In Figures 12, 13, and 14 the metallic window frame A is constructed to carry one window, and by reference to Figure 14 it will be seen that the recess B in the side jamb 10 is similar to that shown in Figures 8, and 9 but, in this case the angular hinge plate 18 is secured to the metallic side jambs by welding. The recess 15 on the frame is further shown with a groove 55 which holds a rubber insert 56.

The rectangular recess 14 in this window frame A, is fitted with a storm sash J which is held in removable position by pivotally mounted catches 52. The storm sash may be glazed for winter or wet weather use, or it may carry a screen for warm weather. In other respects the window frame is similar to that already described. It will be noted however that the U-shaped pocket 51 serves as a stiffener to the metal side jambs 10 of the window frame.

Again in Figure 13 the parting rib 8 of the header 9 is formed with a groove 73 for the reception of a rubber insert 74 engages the upper portion F of the window when closed.

In Figure 12 the stool 12 is checked to engage the window lift 1 on the lower portion G of the window.

Figure 15 differs from Figures 12, 13, and 14 as it is adapted to carry a permanent storm glass window by duplicating the recess B in each side jamb of the window frame A. In this case the window frame is made in two parts, between which a rubber insulator K is positioned when the two parts are assembled. It is not thought necessary to further describe the metallic frame as it would only result in redundancy in the specification.

I have described in full detail the construction of a vertically operated window in which the glass of the window is sashless and formed of two portions, but sashless forms of window may be used with equal success on a horizontally disposed window and to this end I have constructed a window frame M of suitable material in which the upper and lower rails of the frame are formed with recesses similar to that previously described, and illustrated and it is thought unnecessary to enlarge on the description of these recesses.

Co-acting with these recesses are a pair of pivotally mounted cover stop plates E1 and through the arcuate wall of the lower stop plate an orifice 80 is provided through which the threaded shank 81 of the bearing 82 extends. The inner end of this shank is flanged at 83 to engage the inner face of the arcuate wall of the cover stop plate E1. The outer end of the shank of the bearing 82 makes threaded engagement with a nut 84 so that the bearing is held firmly in fixed position on the cover stop plate E1 but, is capable of being removed to dissemble the bearing if and when required.

Rotatably mounted in the bearing 82 is a cylindrical rod 85 the lower end of which extends beyond the flange 83 and carries a pinion or gear 86. The radial wall 87 of the cover stop plate E1 is provided with a slot 88 through which a rib 89 of the rack 90 extends. The inner end of the rib carries end clips 91 which are adapted to engage the vertical edges of one of the glass portions 92 of the window.

Rotary motion is imparted to the gear 86 by the crank arm 93 which is attached to the outer end of the cylindrical rod 85.

The glass of the window is formed of two rectangular portions 92 and 94 and when placing the window in position the upper cover stop plate E1 is rotated outwardly and the lower cover stop plate E1 is similarly rotated outwardly until its movement is stopped by the cylindrical rod 85 and crank arm 93 engaging the window frame.

The glass portion 94 is now positioned in the frame M and the second glass portion 92 is engaged at its vertical edges by the clips 91 and the lower stop plate E1 is now rotated to close position in which the radial wall 87 presses against the face of the glass. The two glass portions 92 and 94 are now in a vertical position with the adjacent ends overlapping. The upper cover stop plate E1 is now rotated to close position.

When it is desired to open the portion 92 of the glass of the window the operator rotates the crank arm 93 in the desired direction and rotary motion is transmitted to the gear 86 and thence to the rack 90 which moves in a longitudinal direction and carries the glass portion 92 of the window to the desired position. The supporting of the window portion 92 by the clips 91 from the rack 90 prevents the window from sagging so that it is always free to move longitudinally when desired.

From the above description it will be clear that I have invented a window frame and co-acting cover window stop which can be advantageously used on sash and sashless windows, and which can also be used with vertically operated windows or horizontally operated windows.

I claim:

1. A window structure comprising a frame having side jambs each provided with parting strips and formed with vertically disposed recesses spaced from, and located in front of the parting strips, a cover for the recesses adapted to form a window stop, means supporting the cover to permit rotation of the cover into the recess, a window pane located between the strip and cover, and a resilient means adapted to press the cover against the window pane.

2. A window structure comprising a frame having side jambs each provided with a parting strip, and formed with vertically disposed recesses spaced from, and located in front of the parting strips, one wall of the recess being arcuate, and a second wall being radial, a cover for the recesses adapted to form a window stop, means on the radial wall adapted to support the cover to permit rotation of the cover into the recess, a window pane located between the strip, and cover, and resilient means adapted to press the cover against the window pane.

3. A window structure comprising a frame having side jambs provided with parting strips, each jamb being formed with a vertically disposed recess spaced from and located in front of the parting strip, a cover for the recess adapted to form a window stop, the cover being formed of upper and lower parts, hinges individually supporting the upper and lower parts to permit individual rotation of each part into the recess, a window pane located between the cover and the parting strip, and resilient means adapted to press each part of the cover individually in contact with the window pane.

4. A window structure comprising a frame having side jambs each provided with a parting strip, and formed with a vertically disposed recess spaced from, and located in front of the parting strip, a cover for the recess adapted to form a window stop, means supporting the cover to permit rotation of the cover into the recess, a window pane located between the parting strip and cover, means for locking the cover in contact with the window pane and resilient means adapted to press the cover against the window pane.

5. A window structure comprising a frame having side jambs each provided with a parting strip, each jamb being formed with a vertically disposed recess spaced from and located in front of the parting strip, a cover for the recess adapted to form a window stop, the cover being formed of upper, and lower parts, a hinge supporting each upper, and lower part, and permitting individual rotation of each part into the recess, a window pane located between the cover, and parting strip, means for locking each part of the cover in contact with the window pane, and resilient means adapted to press each part of the cover individually in contact with the window pane.

6. A window structure comprising a frame having side jambs, a parting strip on each jamb, each jamb being provided with a vertically disposed recess spaced from, and located in front of the parting strip, a cover formed of upper and lower parts for the recess, and adapted to form a window stop, the upper part being bevelled adjacent the lower end, a window pane formed of upper and lower parts located between the cover, and parting strip, the lower part of the window pane being slidable, and adapted to co-act with the bevelled portion of the upper part of the cover, and resilient means for pressing each part of the cover individually in contact with the window pane.

7. The window structure claimed in claim 6 in which means for locking each part of the cover in contact with the window pane is provided.

8. A window structure comprising a frame having side jambs, a parting strip on each jamb, each jamb being provided with a vertically disposed recess spaced from and located in front of the parting strip, a cover for the recess adapted to form a window stop, the cover being formed of upper and lower parts, mounted for individual rotation of each part into the recess, a window pane formed of upper and lower parts, and located between the cover and parting strip, a stop bar located adjacent the parting strip, and adapted to engage the lower edge of the upper part of the window pane to hold it in position, means for locking each part of the cover in contact with the window pane, and resilient means adapted to press each part of the cover individually in contact with the window pane.

9. A window structure comprising a frame having side jambs, a parting strip on each jamb, each jamb being provided with a vertically disposed recess spaced from and located in front of the parting strip, a cover for the recess adapted to form a window stop, the cover being formed of upper and lower parts and mounted for individual rotation of each part into the recess, a window pane formed of upper and lower parts, and located between the cover and parting strip, a channel embracing each lateral edge of the upper part of the window pane, one of the walls of the channel being cut away and formed with a bevelled edge, the lower part of the window pane being slidable and adapted to engage the bevelled edge of the channel to permit the lower part of the window pane to slide freely in front of the upper part, means for locking each part of the cover in contact with the window pane and resilient means adapted to press each part of the cover individually in contact with the window pane.

10. The window structure claimed in claim 9, in which the upper part of the cover for the recess is formed with a lower bevelled edge.

11. A window structure comprising a frame having side jambs, a parting strip on each jamb, each jamb being provided with a vertically disposed recess spaced from and located in front of the parting strip, a cover for the recess adapted to form a window stop, the cover being formed in two parts, means supporting the cover to permit rotation of each part into the recess, a window pane located between the parting strip, and cover, the window pane being formed of upper and lower parts, resilient means adapted to press the cover against the window pane, a channel shaped lifting bar embracing the lower edge of the lower window pane, a hand grip on the lifting bar, resiliently controlled locking pins in the hand grip adapted to co-act with the lower part of the cover, and means for manually retracting the pins.

12. A window structure comprising a frame having upper and lower members, sashless glass portions slidably mounted in the frame in overlapping position, upper and lower cover stop plates rotatably mounted on the upper and lower members of the frame, means for pressing said stop plates against said glass portions, a gear rotatably supported on the lower cover stop plate, a rack meshing with the gear, means on the rack adapted to engage one of the glass portions of the window and means for manually rotating the gear.

13. The window structure claimed in claim 12 in which the rack is provided with a rib formed with clips to engage the vertical edges of one of the glass portions of the window.

14. The window structure claimed in claim 12 in which the gear is provided with a shank rotatably supported from the lower cover stop plate, and a crank for manually rotating the shank.

References Cited in the file of this patent

UNITED STATES PATENTS 1,042,591    Oldberg _____ Oct. 29, 1912